United States Patent [19]

Pampus et al.

[11] 3,920,773

[45] Nov. 18, 1975

[54] MODIFICATION OF POLYMERS

[75] Inventors: Gottfried Pampus, Leverkusen; Wolfgang Oberkirch, Cologne; Peter Günther, Opladen; Nikolaus Schön, Leverkusen, all of Germany

[73] Assignee: Bayer Aktiengesellschaft, Germany

[22] Filed: Dec. 15, 1972

[21] Appl. No.: 315,437

Related U.S. Application Data

[63] Continuation of Ser. No. 114,043, Feb. 9, 1971, abandoned.

[30] Foreign Application Priority Data

Mar. 3, 1970 Germany............................ 2009740

[52] U.S. Cl..... 260/94.7 HA; 260/85.1; 260/88.2 S; 260/94.7 A; 260/94.7 D; 260/93.1; 260/83.3
[51] Int. Cl............................. C08d 5/02; C08f 5/00
[58] Field of Search......... 260/94.7 D, 94.7 A, 85.1, 260/83.3, 88.2 S, 93.1, 94.7 HA

[56] References Cited

UNITED STATES PATENTS

| | | | |
|---|---|---|---|
| 3,558,589 | 1/1971 | Bethea et al.................. | 260/94.7 D |
| 3,647,908 | 3/1972 | Medema et al............ | 260/94.7 D X |

*Primary Examiner*—William F. Hamrock
*Attorney, Agent, or Firm*—Connolly & Hutz

[57] ABSTRACT

Method for modifying polymers which contain —CH=CH—groups by treating such polymers with a catalyst comprising a tungsten salt and an organo compound of a metal of groups I to IV of the Periodic Table.

4 Claims, No Drawings

MODIFICATION OF POLYMERS

CROSS REFERENCE TO RELATED APPLICATION

This application is a continuation of application Ser. No. 114,043 filed Feb. 9, 1971 and now abandoned.

The present invention relates to a method of modifying polymers which contain —CH=CH—groups as structural elements. These structural elements may be present in two different steric configurations, i.e. trans-configuration

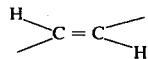

I or cis-configuration

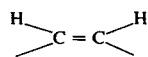

II

The type of steric configuration which is predominant in a given polymer largely determines its physical properties. Predominant in this context means that more than about 60%, preferably more than about 70% of all —CH=CH— groups have this configuration. Though sterically completely uniform synthetic polymers are not known, up to 99% of all —CH=CH— groups present in the polymer may in the same configuration. Naturally occuring polymers such as hevea rubber, balata, gutapercha, however, are nearly 100% sterically uniform.

An example for a synthetic polymer which is known in predominantly cis- and predominantly trans-configuration is polybutadiene. Polybutadiene having mainly 1,4-cis-configuration is a soft plastic rubber whereas polybutadiene which has predominantly 1,4-trans-configuration is a hard tough mass with a softening range of 140° to 160°C.

Another such example is polypentenamer, the product of ring opening polymerisation of cyclopentene. This product is also known in predominantly trans- and predominantly cis-configuration which differ considerably in their physical properties.

Object of this invention is a process for modifying polymers which contain —CH=CH— groups as structural elements which process comprises treating said polymers with a catalyst of
 a. a tungsten salt and
 b. an organo compound of a metal of groups I to IV of the Periodic Table (the Periodic Table referred to in this context is printed in "Handbook of Chemistry and Physics" 47th edition 1966, page B-3, published by Chemical Rubber Company, Cleveland, Ohio)

In a preferred embodiment the polymers are dissolved in an inert organic solvent when subjected to the treatment of the invention.

In another preferred embodiment the catalyst contains a cocatalyst as a third constituent.

The result of the treatment of this invention is a conversion of cis—CH=CH—groups to trans—CH=CH— groups and consequently a considerable change in the physical properties of the polymers. More specifically the starting materials for the modification process should contain at least 30% of their —CH=CH— groups in the cis-configuration. The resulting modified products contain up to 90% of all their —CH=CH— groups in the trans-configuration. The modification process of this invention thus is preferably used to convert polymers having predominantly cis-configuration of their double bonds to products having predominantly trans-configuration.

Any polymers which contain —CH=CH—groups as a constituent of their main polymer chain or of a side chain can be subjected to the treatment of this invention, provided the —CH=CH— group is capable of different steric configurations. (Stated differently, a —CH=CH$_2$ group is excluded, as it is incapable of different steric arrangements.) In view of the forgoing some of these groups preferably at least 30% and most preferably at least 70% should be in the cis-configuration. Most preferred are polymers which contain one isolated carbon-carbon double bond for each 4 to 20 carbon atoms in the polymer chain. Examples of suitable polymers are those which contain polymerised butadiene, pentadiene or cyclopentene, for instance polybutadiene, polypentadiene, polypentenamers, copolymers of butadiene, for instance with styrene or acrylonitrile and copolymers of cyclopentene with other cycloolefinic hydrocarbons. Many of the suitable starting polymers are rubber like materials. However, some are liquid or semi-liquid products. The high molecular weight products which usually constitute rubbers are preferably treated as solutions in inert organic solvents, whereas low molecular weight products, for instance so-called polybutadiene oils which are liquids or semi-liquids can be treated in the absence of solvents. Solutions which are used are generally 10 to 50% by weight solutions.

Suitable solvents for the process are for example aliphatic or aromatic hydrocarbons such as pentane, hexane, heptane, benzene and toluene and halogenated hydrocarbons such as carbon tetrachloride and chlorobenzenes.

Tungsten salts which are suitable as catalyst constituents are for instance tungsten halides such tungsten hexafluoride, tungsten hexachloride, tungsten pentabromide and tungsten pentachloride or also tungsten salts which contain organic radicals for example $Cl_5WOR$, or $Cl_4W(OR)_2$ wherein R denotes an alkyl radical preferably an alkyl radical containing 1 to 6 carbon atoms such as methyl, ethyl, propyl, isobutyl or hexyl. The quantity of tungsten salt is perferably between 0.1 and 10 mmols of tungsten per 100 g of polymer.

Organo compounds of metals of groups I to IV of the Periodic System are e.g. organic compounds of lithium, magnesium, beryllium, aluminum, silicon, zinc and tin. Most preferred are organo aluminum compounds. Examples of such compounds are aluminum trialkyls, $AlR_3$, aluminum alkyl halides, $HalAlR_2$ or $Hal_2AlR$ as well as aluminum hydride compounds. Hal in these formulas denotes halogen atom such as chlorine, bromine or iodine and R denotes an alkyl radical containing 1 to 12 carbon atoms or an alkoxy radical containing 1 to 12 carbon atoms. Specific examples of suitable organo aluminum compounds are aluminum triethyl, aluminum triisobutyl, aluminum tridodecyl, aluminum ethyldichloride, aluminum diethylchloride, diethylaluminumethoxid.

The molar ratio of tungsten to the metal groups I to IV of the Periodic System is preferably from 1:0.2 to 1:20.

As cocatalysts epoxides and halogenated alcohols are especially suitable. They can be used in an amount corresponding to the following ratio: W:cocatalyst= 1:0.1–1:10 and preferably 1:1–1:3.

Suitable epoxides can be represented by the formula

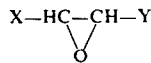   III wherein X is hydrogen, alkyl, aryl and aralkyl, Y is hydrogen, alkyl, aryl, aralkyl, halogenalkyl and alkoxyalkyl. More especially X represents hydrogen, alkyl, having 1 to 6 carbon atoms, phenyl and benzyl and Y represents hydrogen, alkyl having 1 to 6 carbon atoms, phenyl, benzyl, chloroalkyl having 1 to 6 carbon atoms and alkoxymethyl, having 1 to 6 carbon atoms in the alkoxy group. Specific examples of such epoxides are ethylen oxide, propylen oxide, butylene oxide, styrene oxide and epichlorohydrine.

Halogen alcohols which are especially suitable are compounds of the formula

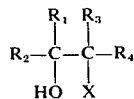   IV wherein X is halogen, for instance, chlorine, bromine or iodine, $R_1$ and $R_2$ represent equal or different hydrogen alkyl, or aryl radicals and $R_3$ and $R_4$ represent equal or different chlorine, bromine, iodine, hydrogen, alkyl, aryl or alkaryl radicals. Additionally $R_1$ and $R_3$ may form a five membered or six membered hydrocarbon ring together with the carbon atoms to which they are bonded. Examples of such alcohols are 2-chloroethanol, 2-bromoethanol, 2-iodoethanol, 1,3-di-chloropropanol-2, 2-chlorocyclohexanol, and 2-chlorocyclopentanol. Thus preferred radicals $R_1$ and $R_2$ are hydrogen, and alkyl having 1 to 6 carbon atoms and preferred radicals $R_3$ and $R_4$ are chlorine, bromine, iodine, hydrogen and alkyl having 1 to 6 carbon atoms.

The process of the present invention is generally carried out by adding the tungsten compound and the organo metallic compound in the indicated quantities to a solution of the polymer and leaving the mixture to react for some time for example from 10 minutes to 5 hours at temperatures of from −20° to +100°C. The polymer is then isolated from the mixture by the usual method such as precipitation or steam distillation. Subsequently the polymer can be stabilized against aging and oxidation in the usual way. If low molecular weight liquid or semi-liquid, starting materials are used no organic solvent is necessary. The catalysts can then be distributed in the polymer as such.

The extent of the modification obtained, meaning the extent of conversion of cis—CH=CH— groups into the corresponding trans-groups, depends on the nature and quantity of the tungsten salt, the nature and quantity of the orgnaic metallic compound and the ratio of tungsten to organo metallic compound and on the reaction time and the reaction temperature. Thus, for example, by reacting a polybutadiene which has less than 50% of its double bonds in the trans configuration with tungsten hexachloride, epichlorohydrin and aluminum diethyl chloride, a trans-1,4-polybutadiene in which more than 80% of the bonds are in the trans configuration can be obtained, e.g. a trans-1,4-polybutadiene (trans more than 65%) from cis-1,4-polybutadiene (cis>85%). This is a very simple and efficient method of preparing trans polybutadiene. Although this product is already known, it is not easily obtained by other methods. The methods previously employed require large quantities of catalyst and result in low yields and a double bond content which often differs considerably from the expected result. As a general rule, the catalysts of the type indicated preferentially bring about rearrangement from the cis configuration to the trans configuration.

Depending on the composition of the catalyst and the reaction temperature, the molecular weight, as identified e.g. by the solution viscosity, may also be altered at the same time.

The amount of double bonds in the converted product is generally equal to the quantity of double bonds in the starting polymer but may also be considerably reduced in the course of the rearrangement without any cross-linking or gel formation being observed. In the present state of the art, substances such as sulphur, iodine and peroxides or mineral salts, aluminium chloride, etc. are used for non-specific rearrangement of double bonds from the trans to the cis configuration or conversely, generally known as isomerisation. These substances are generally useless when applied to polymers because they result in substantial unwanted side reactions and at best isomerisation can be taken as far as the equilibrium at the temperature employed.

The process according to the invention, on the other hand, can be steered specifically to one configuration by suitable choice of catalyst, and unwanted side reactions do not occur.

The modified polymers according to the invention are mostly polymers of known type with rubber-like or thermoplastic properties. According to the invention, they can be obtained with predetermined cis double bond and trans double bond contents.

EXAMPLE 1

2.0 Millimols of the reaction product of $WCl_6$ with 2 mols of epichlorohydrin in the form of a 0.2 molar solution in toluene are added to a solution of 50 g. of cis-1,4-polybutadiene (96% cis) in 500 ml. of anhydrous toluene. The reaction mixture is then cooled to −5°C. and 2.0 millimols of diethyl aluminium chloride are added. The reaction mixture is stirred for 4 hours at −5°C. and the reaction product is isolated by precipitation with ethanol. A trans polybutadiene having a trans content of 95% is obtained.

EXAMPLE 2

2.0 Millimol of $WF_6$ followed, at −5°C., by 3.0 millimol of ethyl aluminium sesquichloride are added to a solution in 500 ml. of anhydrous toluene of 50 g. of a polybutadiene having 46% of its bonds in the cis configuration, 43% in the trans configuration and 11% in the 1,2-configuration. The process is then continued as in Example 1 and a polybutadiene rubber having 82% bonds in the trans configuration, 7% in the cis configuration and 11% in the 1,2-configuration is obtained in quantitative yield.

EXAMPLE 3

35 g. of a polypentenamer which had been obtained by ring opening polymerisation of cyclopentene and which contained equal amounts of double bonds in the cis configuration and trans configuration were dissolved in 600 ml. of anhydrous toluene, and 1.0 millimol of the reaction product of $WCl_6$ with 1 mol of chloroethanol in the form of a 0.1 molar solution in toluene was added to this solution. 3.0 millimol of diethyl aluminium chloride were then added and the reaction mixture was stirred for 2 hours at 0°C.. The polymer obtained after working up has more than 85% of all the double bonds in the trans configuration.

EXAMPLE 4

Various polymer solutions were prepared. In each case, 100 g. of cis-1,4-polybutadiene having 96% of its double bonds in the 1,4-cis configuration were dissolved in 1,200 parts of benzene in a vessel equipped with stirrer, the operation being carried out under a nitrogen atmosphere with exclusion of water and oxygen. 2 Millimol of $WCl_6$ in the form of a 3.5% solution in toluene were then added in each case at 20°C.. The polymer solutions were cooled to 5°C. and stirred with various aluminium alkyls which were added in the form of 20% solutions in toluene. The polymer solutions were kept at 5°C. for 1 to 4 hours with stirring and then worked up, in each case by stirring into the solution 0.5 g. of 2,2'-dihydroxy-3,3'-di-tertiary-butyl-5,5'-dimethyl-diphenylmethane and 1.5 g. of ethanolamine dissolved in 50 ml. of toluene and 10 ml. of ethanol. All the polymer was then precipitated with ethanol and dried in a vacuum at 50°C.. The results of the experiments are summarised in the following Table.

| Experiment | Aluminium component | mmol Al | Reaction time, h | Yield | Structure IR 1,4-cis | trans 1,4 | 1,2 |
|---|---|---|---|---|---|---|---|
| a) | $Al(C_2H_5)_3$ | 1.5 | 4 | 97 | 17.8 | 79.8 | 2.4 |
| b) | $Al(C_2H_5)_3$ | 2.0 | 4 | 98 | 13.2 | 84.6 | 2.2 |
| c) | $Al(C_2H_5)_2Cl$ | 2.0 | 1 | 100 | 34.7 | 62.2 | 3.1 |
| d) | $Al(C_2H_5)_2Cl$ | 2.0 | 4 | 98 | 9.6 | 88.3 | 2.2 |

We claim:

1. A process for treating a polymer containing —CH=CH— groups of which at least 30% are of the cis-configuration so as to obtain a modified polymer containing —CH=CH— groups of which at least 90% are of the trans-configuration, said process comprising treating at a temperature of —20° to 100°C. a 10 to 50% solution of said polymer in an inert organic solvent with a catalyst of a. a tungsten hexachloride or tungsten hexafluoride,
b. a compound of the formula $AlR_3$, $HalAlR_2$ or $Hal_2AlR$ wherein Hal is chlorine, bromine or iodine and R is alkyl or alkoxy having 1 to 12 carbon atoms and
c. an epoxide or a halogen alcohol, the amount of (a) being 0.1 to 10 mmols per 100 g of polymer, the molar ratio of (a) to (b) being 1:0.2 to 1:20 and the molar ratio of (a) to (c) being 1:0.1 to 1:10, said epoxide being of the formula

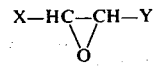

wherein X is hydrogen, alkyl having 1 to 6 carbon atoms, phenyl, or benzyl and Y is hydrogen, alkyl having 1 to 6 carbon atoms, phenyl, benzyl, chloroalkyl having 1 to 6 carbon atoms or alkoxymethyl having 1 to 6 carbon atoms in the alkoxy moiety and said halogen alcohol being of the formula

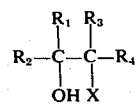

wherein X is chlorine, bromine or iodine, $R_1$ and $R_2$ are each hydrogen or alkyl having 1 to 6 carbon atoms and $R_3$ and $R_4$ are each hydrogen, chlorine, bromine, iodine or alkyl having 1 to 6 carbon atoms.

2. The process of claim 1 wherein the polymer is polybutadiene, polypentadiene, polypentenamer, a copolymer of butadiene and styrene, a copolymer of butadiene and acrylonitrile or a copolymer of cyclopentene with another olefinic hydrocarbon.

3. The process of claim 1 wherein said polymer is polybutadiene having less than 50% of its double bonds in the 1,4-trans-configuration.

4. The process of claim 1 wherein the polymer is polybutadiene containing more than 85% of its double bonds in the 1,4-cis-configuration.

* * * * *